US 12,461,855 B2

(12) United States Patent
Kokkala et al.

(10) Patent No.: US 12,461,855 B2
(45) Date of Patent: Nov. 4, 2025

(54) SYSTEM AND METHOD FOR MEMORY BANDWIDTH REDUCTION USING A PROGRAMMABLE CACHE LINE

(71) Applicant: Think Silicon Research and Technology Single Member S.A., Rion Achaias (GR)

(72) Inventors: Chrysa Kokkala, Patras (GR); Nikolaos Mitas, Patras (GR); Iakovos Stamoulis, Patras (GR); Georgios Keramidas, Patras (GR)

(73) Assignee: Think Silicon Research and Technology Single Member S.A., Rion Achaias (GR)

( * ) Notice: Subject to any disclaimer, the term of this patent is extended or adjusted under 35 U.S.C. 154(b) by 0 days.

(21) Appl. No.: 18/068,938

(22) PCT Filed: Dec. 12, 2022

(86) PCT No.: PCT/GR2022/000069
§ 371 (c)(1),
(2) Date: Dec. 20, 2022

(87) PCT Pub. No.: WO2024/127046
PCT Pub. Date: Jun. 20, 2024

(65) Prior Publication Data
US 2025/0291721 A1    Sep. 18, 2025

(51) Int. Cl.
*G06F 12/00*    (2006.01)
*G06F 12/02*    (2006.01)
*G06F 12/0802*    (2016.01)

(52) U.S. Cl.
CPC ...... *G06F 12/0802* (2013.01); *G06F 12/0223* (2013.01); *G06F 2212/1021* (2013.01)

(58) Field of Classification Search
CPC ............. G06F 12/0802; G06F 12/0223; G06F 2212/1021
See application file for complete search history.

(56) References Cited

U.S. PATENT DOCUMENTS 5,799,203 A * 8/1998 Lee ..................... G06F 15/177
                                                                                710/36
8,626,815 B1    1/2014 Langhammer
2003/0046510 A1    3/2003 North
(Continued)

FOREIGN PATENT DOCUMENTS

EP         4390854 A1 * 6/2024 ............. G06T 15/04
WO    WO-9923610 A1 * 5/1999 ........... G06T 15/005
WO    WO-2005020582 A1 * 3/2005 ............. H04N 5/144

*Primary Examiner* — Shawn X Gu
*Assistant Examiner* — Mohammad S Hasan
(74) *Attorney, Agent, or Firm* — M&B IP Analysts, LLC

(57) ABSTRACT

A system and method for memory bandwidth reduction utilized a programmable cache line. The method includes generating an instruction to render a modified texture based on a modification of a texture, the texture stored as a plurality of lines in a memory, each line addressable by a unique address; determining an amount of data to read from a first line of a texture based on the modification; configuring a programmable cache line to read into a cache at least the determined amount of data from a unique address corresponding to the first line; and storing at least a portion of the determined amount of data in a first line of a framebuffer.

23 Claims, 5 Drawing Sheets

(56) References Cited

U.S. PATENT DOCUMENTS

| | | | |
|---|---|---|---|
| 2003/0093702 A1* | 5/2003 | Luo | G06F 1/32 |
| | | | 713/320 |
| 2006/0017722 A1* | 1/2006 | Hong | G06T 15/04 |
| | | | 345/582 |
| 2023/0252693 A1* | 8/2023 | Connor | A63F 13/52 |
| | | | 345/582 |

* cited by examiner

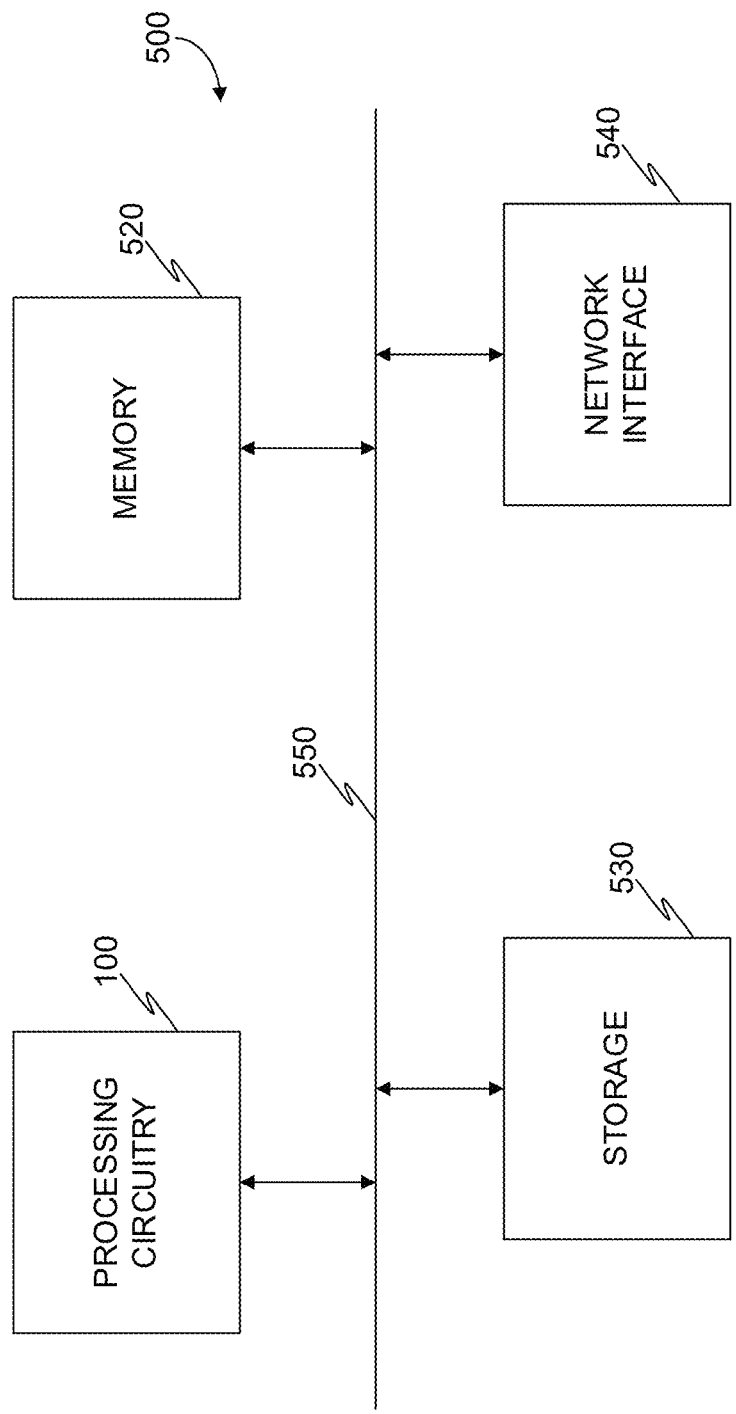

SYSTEM AND METHOD FOR MEMORY BANDWIDTH REDUCTION USING A PROGRAMMABLE CACHE LINE

CROSS-REFERENCE TO RELATED APPLICATIONS

This application is a National Stage Application submitted under 35 U.S.C. 371 of PCT Application No. PCT/GR2022/000069 filed on Dec. 12, 2022, the contents of which are hereby incorporated by reference.

TECHNICAL FIELD

The present disclosure relates generally to memory bandwidth reduction in processing circuitry, and specifically for reducing memory bandwidth when utilizing a texture map by a programmable cache line.

BACKGROUND

A digital display is a two dimensional electronic-based display. Some common technologies today include liquid-crystal displays (LCDs), light-emitting diode (LED) displays, organic LED (OLED) displays, and the like, though past technologies such as cathode-ray tube (CRT) displays are still used, though going out of style. No matter the presentation technology, displays often utilize pixels, which are the smallest are of which color, brightness, a combination thereof, and the like, can be controlled. Modern displays may have millions of such pixels, each pixel being updated multiple times per second.

Computer processors which provide pixel data to displays must therefore provide a large amount of information from the computer to the display in a short amount of time. Further, while these displays are two dimensional, it is often desirable to display a three dimensional scene, as humans view the world in three dimensions.

In order to provide this, processing circuitries are developed which allow projecting a three dimensional image onto a two dimensional display, thereby given an illusion of a three dimensional scene. One such technique used to accomplish this is known as texture mapping (or diffuse mapping).

Projection involves multiple cycles of processing by a processing circuitry. Generally, the amount of cycles can be correlated to the size of the display, number of pixels, number of channels describing the pixels, and number of textures applied, where a multi-texture mapping is performed. Each of these cycles consumes power, requires memory space, and takes time. Reducing any of these is advantageous, as power consumption and memory utilization translate to consumer cost, and time translates to the experience a consumer has.

Texture mapping often includes translation of the texture map. Translation can be, for example, rotating, stretching, contracting, a combination thereof, and the like. When performing translation of a texture map often more of the texture map is read than is required, thus leading to utilizing more memory to store bits which are not required for a specific calculation. This is due to storing the texture map as lines in a memory cache, and is an inherent property of how a memory is configured to store information.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for memory bandwidth reduction using a programmable cache line. The method comprises: generating an instruction to render a modified texture based on a modification of a texture, the texture stored as a plurality of lines in a memory, each line addressable by a unique address; determining an amount of data to read from a first line of a texture based on the modification; configuring a programmable cache line to read into a cache at least the determined amount of data from a unique address corresponding to the first line; and storing at least a portion of the determined amount of data in a first line of a framebuffer.

Certain embodiments disclosed herein also include a non-transitory computer readable medium having stored thereon causing a processing circuitry to execute a process, the process comprising: [to be completed based on final claims] generating an instruction to render a modified texture based on a modification of a texture, the texture stored as a plurality of lines in a memory, each line addressable by a unique address; determining an amount of data to read from a first line of a texture based on the modification; configuring a programmable cache line to read into a cache at least the determined amount of data from a unique address corresponding to the first line; and storing at least a portion of the determined amount of data in a first line of a framebuffer.

Certain embodiments disclosed herein also include a system for memory bandwidth reduction using a programmable cache line. The system comprises: a processing circuitry; and a memory, the memory containing instructions that, when executed by the processing circuitry, configure the system to: generate an instruction to render a modified texture based on a modification of a texture, the texture stored as a plurality of lines in a texture memory, each line addressable by a unique address; determine an amount of data to read from a first line of a texture based on the modification; configure a programmable cache line to read into a cache at least the determined amount of data from a unique address corresponding to the first line; and store at least a portion of the determined amount of data in a first line of a framebuffer.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5 is a schematic diagram of a computing system with a memory reducing graphics processing pipeline, implemented according to an embodiment.

DETAILED DESCRIPTION

Figure 1:
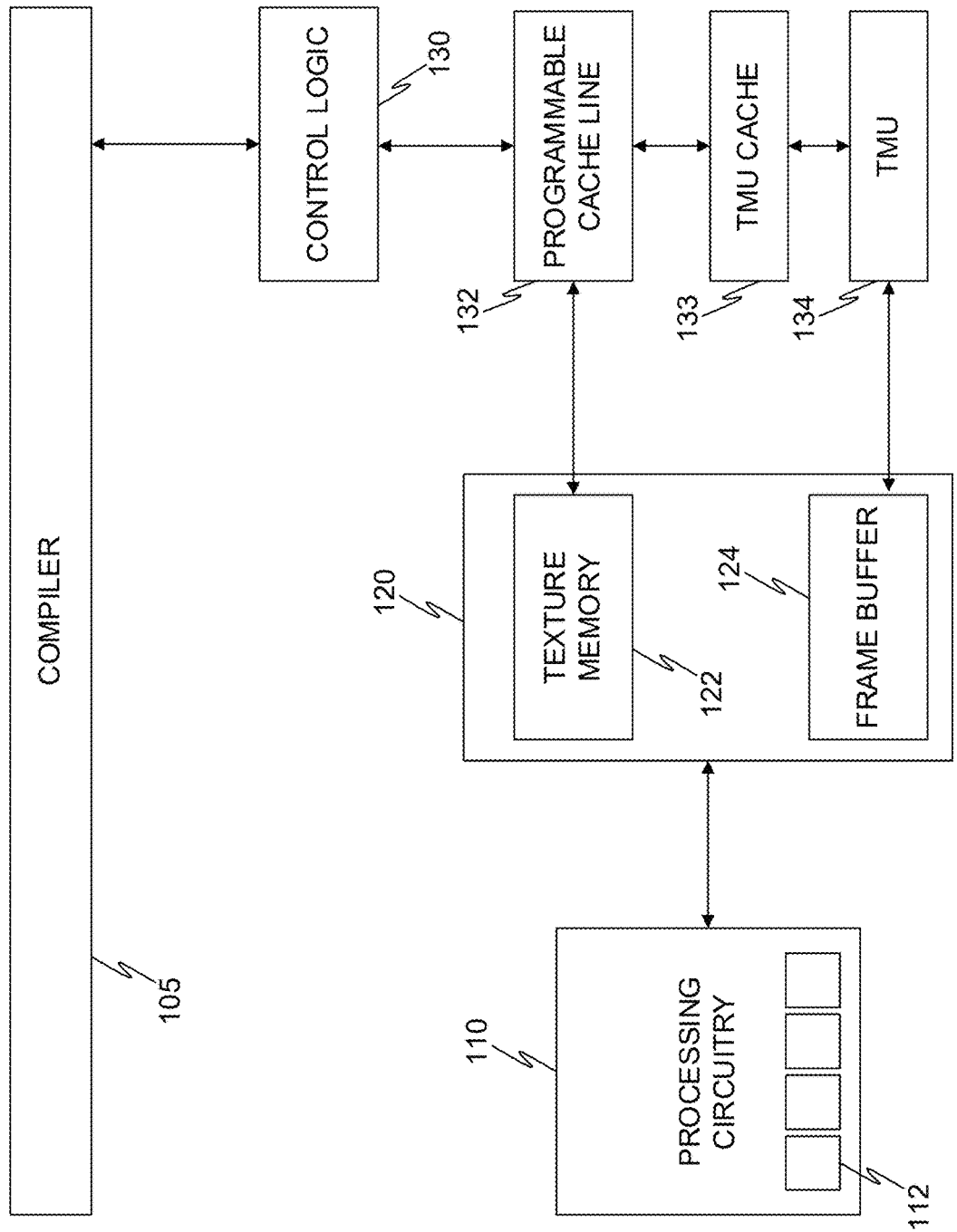
FIG. 1 is a schematic diagram of a processing pipeline, implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for reducing memory usage between a texture map unit (TMU) and a cache memory. The system includes a programmable cache line which is configured to fetch a programmable amount of data of a texture from a memory. In an embodiment, an instruction is generated to render a modified texture based on a modification of a texture. In an embodiment, a modification is a rotation, a scaling, a compression, a combination thereof, and the like. The texture is stored in a memory, storage, and the like, for example as lines addressable by a unique address, according to an embodiment. An amount of data is determined based on the modification, and the programmable cache is configured to read at least the determined amount of data from a corresponding address into a cache memory of a TMU.

This is advantageous according to an embodiment as only the required amount of data is read from the memory, thus allowing to reduce the memory bandwidth usage. For example, where a texture is rotated by an amount of determined degrees, the programmable cache line is configured to read into a cache memory the bits which are actually utilized to render a particular line. For example, based on a modification, a system determines that a first rendered line includes the first two pixels of the first line of the texture, pixels 4 through 10 of the second line of the texture, etc. Therefore, the programmable cache line is programmed to read data pertaining to each group of pixels in order to render the line based on the modification. This process continues, in an embodiment, until a full frame, an object in a frame, and the like, is rendered.

FIG. 1 is an example schematic diagram 100 of a processing pipeline, implemented according to an embodiment. In an embodiment, a compiler 105 is implemented as a software application which is configured to receive a source code and generate a translation of the source code into machine code, bytecode, and the like, which is executable by the processing circuitry 110.

In an embodiment, the processing circuitry 110 includes a processing core 112. In certain embodiments, the processing circuitry 110 includes multiple processing cores. Each core is configured to process a single thread, multiple threads, and the like, according to an embodiment. In some embodiments a processing circuitry 110 includes multiple cores, wherein a first group of processing cores share a first instruction set architecture (ISA) and a second group of processing cores share a second ISA. In some embodiments, the first ISA includes the second ISA. In certain embodiments the first ISA and the second ISA are identical.

The processing circuitry 110 is realized in an embodiment as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), general purpose GPUs (GPGPUs), tensor processing units (TPUs), general-purpose microprocessors, microcontrollers, digital signal processors (DSPs), and the like, or any other hardware logic components that can perform calculations or other manipulations of information.

In an embodiment the processing circuitry 110 is coupled to a memory 120. In some embodiments, the memory 120 is an on-chip memory, an off-chip memory, a scratchpad memory, a combination thereof, and the like. In an embodiment, the memory 120 includes a texture memory 122 and a framebuffer 124. In certain embodiments, the framebuffer 124 is implemented as a random access memory (RAM). In some embodiments, the texture memory 122 is implemented as a non-volatile memory (NVM).

According to an embodiment, the compiler 105 is configured to generate instructions for execution by a control logic 130. In an embodiment, the compiler 105 is configured to read code, which in an embodiment includes a metadata annotation indicating to translate a texture stored in the texture memory 122, and determine a number of bits to read from the texture memory 122 into a texture mapping unit (TMU) cache 133 to be read into a TMU 134. In certain embodiments the TMU 134 is configured to generate an output written to the framebuffer 124. In some embodiments the metadata annotation is generated at runtime and provided to any one of: the compiler 105, the TMU 134, a combination thereof, and the like.

For example, in an embodiment the compiler 105 is configured to generate an instruction for execution by a control logic 130, which when executed by the control logic 130, configures the control logic 130 to utilize a programmable cache line 132 to read a predetermined amount of data (e.g., a number of bits) from the texture memory 122 into a texture map unit (TMU) cache 133. In an embodiment, the compiler 105 is configured to predetermine the number of bits which need to be read.

In an embodiment, the programmable cache line 132 is a cache memory which includes a plurality of bytes, each addressable by a unique address. In some embodiments, the programmable cache line 132 has a size of 128 bytes, 256 bytes, 512 bytes, 1,024 bytes. In some embodiments, the programmable cache line 132 size is determined by an indicator bit, a plurality of indicator bits, and the like. For example, an indicator bit value of '00' indicates a size of 128 bytes, an indicator bit value of '10' has a 512 byte size, and the like.

In some embodiments, the indicator bit value indicates an address for data which should be read. For example, a memory in which a texture is stored is a block-addressable memory. In an embodiment, the indicator bit value indicates that data should be read from a block at a specific address associated with the block. For example, in an embodiment an indicator bit value of '101' indicates that data should be read from the second block of the memory, from bytes 128 to 256.

In certain embodiments, the programmable cache line 132 is configured to read a predetermined number of bytes from a texture memory 122 at an address. In an embodiment the address is received from the compiler 105. The programmable cache line 132 is configured to supply the bytes read from the texture memory 122 to a texture mapping unit (TMU) 134 by writing data into a TMU cache 133.

In an embodiment, the TMU 134 is a circuitry configured to rotate, resize, distort, project, and the like, a bitmap image onto a predetermined model, such as a three dimensional model. In some embodiments, a TMU 134 is configured to receive an input including data representing a plurality of pixels. In some embodiments, a place in a data structure indicates a corresponding place on a display. In an embodiment, the TMU 134 is configured to receive data of a first pixel and a change instruction, and determine a placement of the first pixel based on the change instruction.

In an embodiment the change instruction includes a rotation, a resizing, a distortion, a projection, a combination thereof, and the like. In an embodiment, data of a first pixel includes 8 bits representing a red channel, 8 bits representing a green channel, 8 bits representing a blue channel, 8 bits representing an alpha channel, a combination thereof, and the like.

In some embodiments, a position of a pixel is determined based on a place of bytes representing the pixel in a memory. For example, data of the first pixel is stored by the first 24 bits of a memory, according to an embodiment. In some embodiments the TMU 134 is configured to generate an output which includes data representing a pixel which is generated as a result of a change instruction. In an embodiment, the TMU 134 is configured to supply the output to the framebuffer 124.

Figure 2:
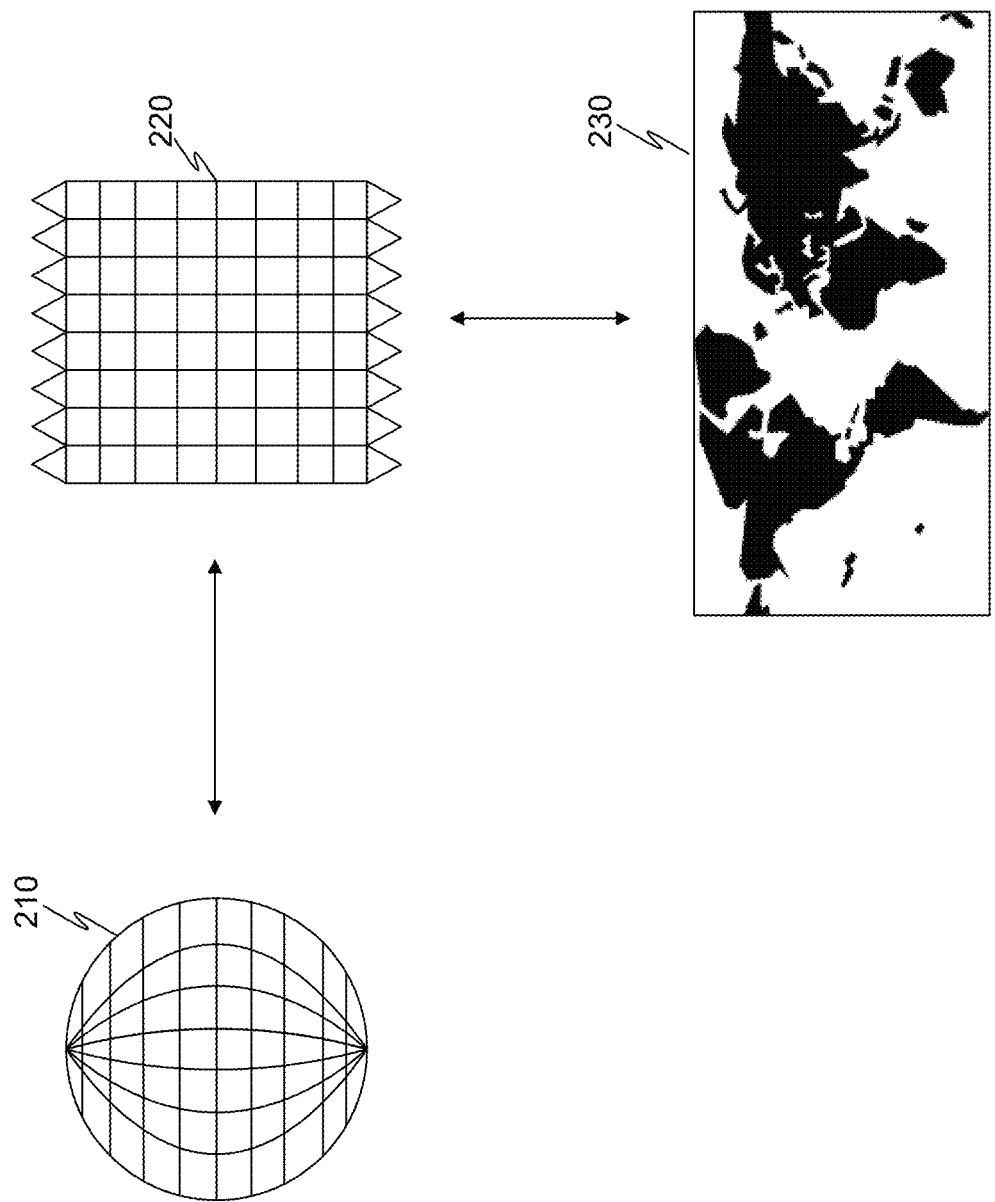
FIG. 2 is a schematic illustration of a UV mapping scheme implemented on a TMU, utilized to describe an embodiment.

FIG. 2 is an example schematic illustration of a UV mapping scheme implemented on a TMU, utilized to describe an embodiment. A three-dimensional model 210 (also referred to as 3D model 210) includes a surface representation. For example, the three-dimensional model 210 includes a surface representation of a sphere. In an embodiment the 3D model 210 is represented by a polygon mesh. A polygon mesh is a data structure which includes vertices, edges, and faces which define a polyhedral object.

A texture map 230 is projected onto the 3D model 210. In an embodiment the texture map 230 is a bitmap stored in a memory. For example, in an embodiment the first 24 bytes of data describe a first pixel, the second 24 bytes of data describe a second pixel, etc.

In order to project the texture map 230 onto the 3D model 210 a mapping is performed between the texture map 230 to a UV map 220 according to an embodiment. In an embodiment the UV map 220 is a two-dimensional representation of the three-dimensional model 210.

In some embodiments, a texture mapping unit, such as the TMU 134 of FIG. 1 above is configured to receive a texture map 230, determine a UV map 220 of a three-dimensional model 210, and generate an output which includes values for generating a pixel of the UV map 220, such that each pixel in the UV map 220 is generated based on at least a pixel of the texture map 230.

Figure 3:
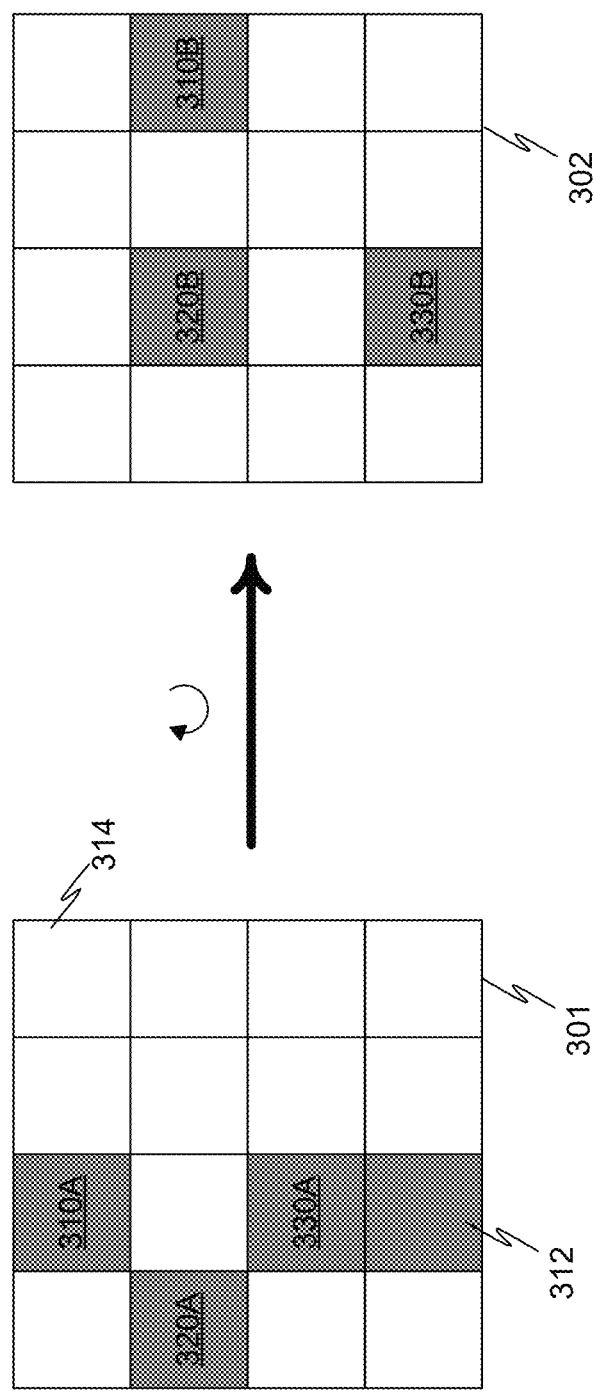
FIG. 3 is a schematic illustration of an output bitmap generated by a texture mapping unit applying a rotation to an input bitmap, implemented in accordance with an embodiment.

FIG. 3 is a schematic illustration of an output bitmap generated by a texture mapping unit applying a rotation to an input bitmap, implemented in accordance with an embodiment. In an embodiment, a bitmap represents an image. For example, according to an embodiment a bitmap 301 includes a plurality of pixels, such as a first pixel 312 and a second pixel 314. In an embodiment, each pixel of the plurality of pixel includes a value. For example, in a binary representation the value of the first pixel 312 is '1' to indicate the pixel should be colored black and the value of the second pixel 314 is '0' to indicate that the pixel should be colored white.

In some embodiments, a plurality of bits are utilized to represent the color of a single pixel. For example, in an embodiment each pixel of a bitmap is represented by eight bytes, which are equal to 64 bits. In some embodiments, an image is represented by a plurality of bitmaps, each bitmap corresponding to a different color (e.g., a red channel bitmap, a green channel bitmap, a blue channel bitmap, an alpha channel bitmap, a combination thereof, and the like).

In an embodiment, the bitmap 301 is provided to a texture mapping unit (TMU) with an instruction to perform a rotation on the bitmap 301. When performing a rotation, the TMU is configured to read the bitmap image from a memory, perform the rotation to generate an output 302, and transfer the output 302 to a framebuffer. In an embodiment a TMU is configured to read a bitmap utilizing a cache line, a programmable cache line, and the like. That is, a bitmap is not read all at once, rather it is read line by line. However, for a rotation, a distortion, a resizing, and the like, certain pixels of each line are utilized for the output, and some are not.

For example, the input bitmap 301 is resized and rotated such that a first rotatable pixel 310A is output as a first rotated pixel 310B, a second rotatable pixel 320A is output as a second rotated pixel 320B, and a third rotatable pixel 330A is output as a third rotated pixel 330B. In an embodiment, rotating a pixel includes storing at a predetermined address data of the pixel. In some embodiments, the address is predetermined by a compiler. For example, a compiler receives an instruction from a software program through an application programming interface (API) to read a texture into a texture cache, perform a change to the read data of the texture from the texture cache by a TMU, and store an output of the TMU in a framebuffer for displaying on a display, according to an embodiment. In other embodiments, the read data is further processed, for example, by a fragment shader, to generate a second output, which is stored in the framebuffer.

Figure 4:
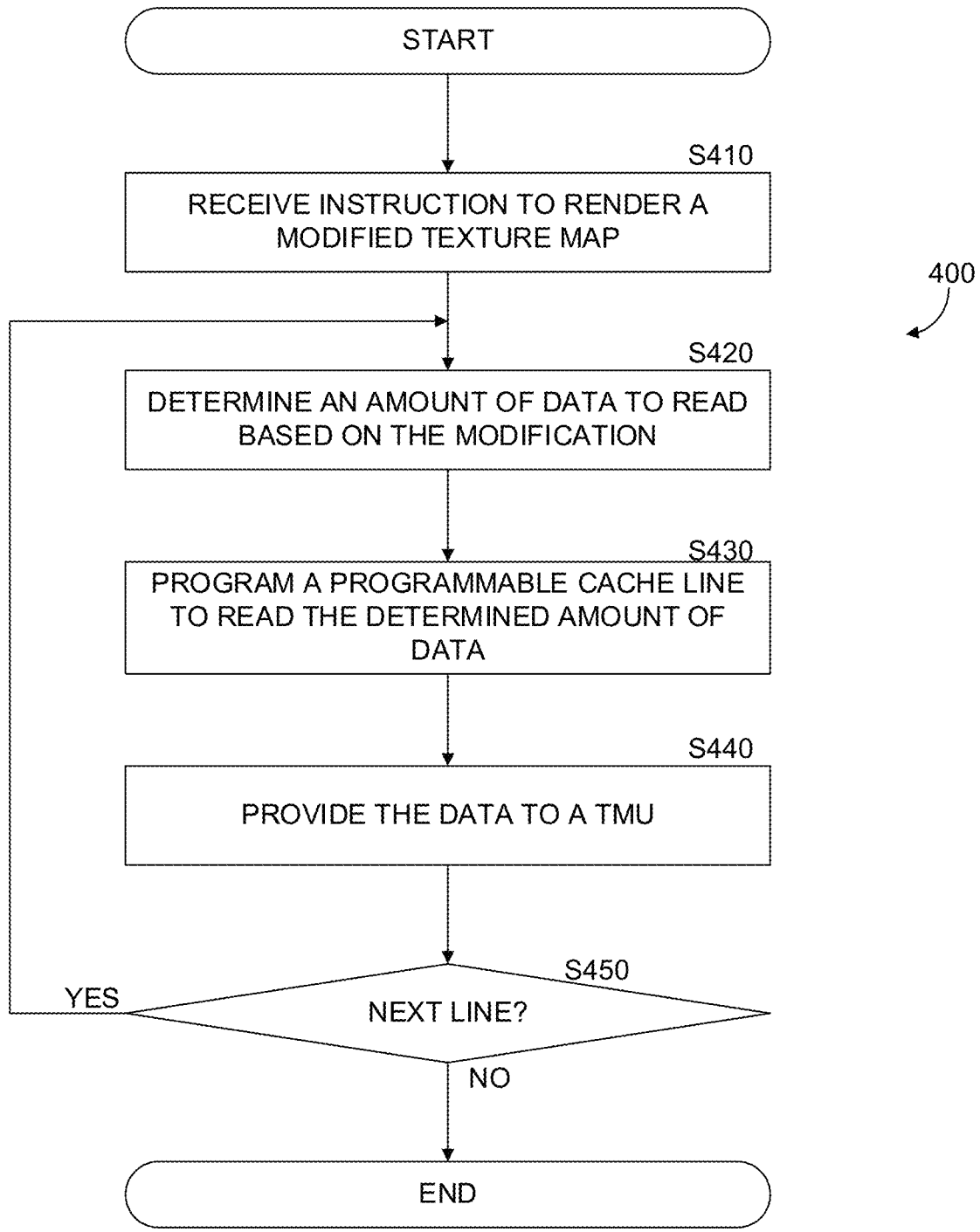
FIG. 4 is a flowchart of a method for utilizing a programmable cache line in texture mapping, implemented according to an embodiment.

FIG. 4 is an example flowchart 400 of a method for utilizing a programmable cache line in texture mapping, implemented according to an embodiment. A programmable cache line allows to utilize less memory bandwidth when transferring data between a texture map memory and a texture cache. In some embodiments, the method is executed utilizing the architecture of FIG. 1 above, and specifically the programmable cache line 132 between the texture memory 122 and the TMU cache 133, which is connected to the TMU 134. This allows utilizing the memory for other purposes, implementing a processing circuitry with less memory, a combination thereof, and the like.

At S410, an instruction is generated to render a modified texture. In an embodiment the instruction includes a location in a memory, storage, combination thereof, and the like, where a texture is stored. In some embodiments, the location is an address in a memory. In some embodiments, the texture is a bitmap. In certain embodiments, the texture includes a plurality of bitmaps. For example, according to an embodiment each of the plurality of bitmaps corresponds to a unique channel. A channel is, according to an embodiment, a red channel, a green channel, a blue channel, an alpha channel, a combination thereof, and the like.

In some embodiments, the modified texture is a texture that is rotated, stretched, contracted, a combination thereof, and the like. In some embodiments, the modification is a transformation. For example, according to an embodiment, the transformation is defined by a matrix which, when applied to the texture, results in a new image which is different from the input image (i.e., the texture).

In an embodiment, the transformation is an affine transformation. An affine transformation is a geometric transformation which preserves lines and parallelism in an image. For example, scaling reflection, rotation, shearing, and the like, are all affine transformations. In some embodiments, a plurality of modifications are received, and an order in which to perform them. In an embodiment applying a modification, transformation, combination thereof, and the like, includes generating a multiplication, convolution, and the like, between an input matrix representing the texture, and a matrix representing the transformation, modification, and the like.

In certain embodiments the instruction includes a degree of rotation. A degree of rotation is represented, in an embodiment, by a value, a list of values, a rotation matrix, a combination thereof, and the like.

At S420, an amount of data is determined based on the degree of rotation. In an embodiment, the amount of data is a number of bits. In some embodiments the number of bits is a number representing a number of bits which are utilized by a TMU to generate an output for providing to a framebuffer memory for rendering a line, a portion of a line, and the like, in a display.

For example, based on a degree of rotation it is determined that from the first line of a texture map the first three pixels are needed to render a first line in a framebuffer. In an embodiment, each pixel is represented by 24 bits, therefore 72 bits of information need to be read from a memory storing therein the texture.

In some embodiments, an amount of data is determined which is equivalent to a number of bits. For example, an amount of data is, according to an embodiment, a number of bytes, a number of blocks, a number of bits, a combination thereof, and the like.

In certain embodiments, a first number of bits is determined for a first line of the texture, and a second number of bits is determined for a second line of the texture, wherein the bits of the second line of the texture are stored consecutively in a first line of the framebuffer after the bits of the first line of the texture.

At S430, a programmable cache line is configured to read the amount of data. In an embodiment, the programmable cache line is further configured to read a number of determined bits from an address of a memory containing therein a texture map.

In some embodiments, the programmable cache line is configured to read a number of bits which is at least as many bits as the determined number of bits. For example, according to an embodiment a programmable cache line is configured to be 64 bytes, 128 bytes, 256 bytes, and the like.

In an embodiment, where the determined amount of data is equal to 72 bytes, the programmable cache line is configured to read 128 bytes. Configuring the programmable cache line to read 64 bytes of data would be insufficient, configuring the programmable cache line to read more than 128 bytes would be redundant as the additional bytes beyond the first 72 bytes would not be used in the framebuffer at this stage. It is therefore advantageous to bring the least amount of bytes that would still include the required 72 bytes.

In some embodiments, the programmable cache line is configured to read an amount of data predetermined by a compiler, such as discussed in more detail in FIG. 1 above.

In certain embodiments, configuring a programmable cache line to fetch a predetermined amount of data includes setting an indicator bit value of the programmable cache line to a value selected from a list of values. Each value corresponds to a unique predetermined amount of data, according to an embodiment. For example, setting the indicator bit value to '00' configures the programmable cache line to read 64 bytes of a memory storing a texture map, setting the indicator bit value to '01' configures the programmable cache line to read 128 bytes of the memory, etc. in accordance with an embodiment. In an embodiment the programmable cache line is further configured to read a number of bits from a specific address. For example, an indicator bit is set, according to an embodiment, to a value which indicates a specific address and a specific amount of data to read from the specific address. In certain embodiments, a first indicator bit is set to a first value which indicates an address, and a second indicator bit is set to a second value which indicates an amount of data.

In some embodiments setting an indicator bit value includes writing the value to a predetermined memory address which when read by a control logic of the programmable cache line, configures the programmable cache line to read a predetermined amount of data from a memory.

At S440, the data is provided to a texture mapping unit (TMU). In an embodiment, an amount of data is periodically determined, and data corresponding to the amount of data is read, for each period an amount is read from a different line (e.g., during the first period an amount of data is read from a first line, during the second period an amount of data is read from a second line, etc.). In certain embodiments this is performed until a full line of data is read which is used to populate a full line of a framebuffer which is connected to the TMU.

For example, in an embodiment 72 bytes of data are read from the first line of a texture map and provided to the TMU, followed by 32 bytes of data read from the second line of the texture map and provided to the TMU, followed by 8 bytes of data read from the third line of the texture map and provided to the TMU, etc.

In an embodiment, the TMU writes the data to a framebuffer in an order at which the data is received. For example, in the example discussed above, the 72 bytes of data would be written first (i.e., to the first address), the next 32 bytes of data are written to second (i.e., to the next address after the last address of the 72 bytes), and the 8 bytes would be written third (i.e., written to the next address after the last address of the 32 bytes).

At S450, a check is performed to determine if data should be read from another line of the texture map. In an embodiment, determining if another line should be read includes determining an amount of data written to the framebuffer, determining a size of the framebuffer, and initiating another read cycle in response to determining that the size of the framebuffer is larger than the amount of data written to the framebuffer.

If 'yes' execution continues at S420, otherwise execution terminates, according to an embodiment. In an embodiment, when a frame is written to a framebuffer, data is read from the framebuffer, and a display is configured to display an image based on the read data. In some embodiments a framebuffer includes sufficient memory to store a plurality of frames. For example, in double buffering a single framebuffer stores a current frame in a first portion of the framebuffer, and while the current frame is rendered a next frame is written into a second portion of the framebuffer. In an embodiment, the framebuffer then switches the first and second portions, so the second portion is displayed while the first portion is written to.

FIG. 5 is an example schematic diagram of a computing system 500 with a memory reducing graphics processing pipeline, implemented according to an embodiment. The system 500 includes a processing circuitry 510 coupled to a memory 520, a storage 530, and a network interface 540. In an embodiment, the components of the system 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

In an embodiment the processing circuitry 510 includes the processing circuitry 110, the control logic 130, the programmable cache line 132, the TMU 134, a combination thereof, and the like, of FIG. 1 above.

The memory 520 may be volatile (e.g., random access memory, etc.), non-volatile (e.g., read only memory, flash memory, etc.), or a combination thereof. In an embodiment the memory 520 includes the memory 120, texture memory 122, framebuffer 124, a combination thereof, and the like, of FIG. 1 above.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for memory bandwidth reduction using a programmable cache line, comprising:
    generating an instruction to render a modified texture based on a modification of a texture, the texture stored as a plurality of lines in a memory, each line addressable by a unique address;
    determining an amount of data to read from a first line of a texture based on the modification;
    configuring a programmable cache line to read into a cache at least the determined amount of data from a unique address corresponding to the first line; and
    storing at least a portion of the determined amount of data in a first line of a framebuffer.

2. The method of claim 1, further comprising:
    determining an amount of data to read from a second line of a texture based on the modification;
    configuring a programmable cache line to read at least the determined amount of data from a unique address of the second line; and
    storing at least a portion of the determined amount of data in the first line of the framebuffer after the amount of data read from the first line of the texture.

3. The method of claim 1, further comprising:
configuring the programmable cache line to read a predetermined amount of data by writing a predetermined value to an indicator bit, wherein the predetermined value corresponds to at least the predetermined amount of data.

4. The method of claim 3, further comprising:
configuring the programmable cache line to read a determined second amount of data by writing a second predetermined value to the indicator bit, which is different from the predetermined value.

5. The method of claim 3, further comprising:
configuring the programmable cache line to read the predetermined amount of data from a memory address.

6. The method of claim 5, further comprising:
writing a predetermined value corresponding to the memory address to a second indicator bit, wherein the second indicator bit indicates an address from an address space of the memory.

7. The method of claim 1, further comprising:
determining an amount of data to read from a first line of a second texture map which is equal to the determined amount of data to read from the first line of the texture map, wherein the second texture map is a bitmap representing a channel of the texture map.

8. The method of claim 1, wherein the programmable cache is configured to read any one of a predetermined amount of data.

9. The method of claim 1, wherein the modification is any one of: a rotation, a stretch, a contraction, a reflection, a scaling, and a combination thereof.

10. The method of claim 1, wherein the amount of data is a discrete amount of bits.

11. The method of claim 1, further comprising:
reading data from the framebuffer; and
configuring a display to display an image based on the data read from the framebuffer.

12. A non-transitory computer readable medium having stored thereon instructions for causing a processing circuitry to execute a process, the process comprising:
generating an instruction to render a modified texture based on a modification of a texture, the texture stored as a plurality of lines in a memory, each line addressable by a unique address;
determining an amount of data to read from a first line of a texture based on the modification;
configuring a programmable cache line to read into a cache at least the determined amount of data from a unique address corresponding to the first line; and
storing at least a portion of the determined amount of data in a first line of a framebuffer.

13. A system for memory bandwidth reduction using a programmable cache line, comprising:
a processing circuitry; and
a memory, the memory containing instructions that, when executed by the processing circuitry, configure the system to:
generate an instruction to render a modified texture based on a modification of a texture, the texture stored as a plurality of lines in a texture memory, each line addressable by a unique address;
determine an amount of data to read from a first line of a texture based on the modification;
configure a programmable cache line to read into a cache at least the determined amount of data from a unique address corresponding to the first line; and
store at least a portion of the determined amount of data in a first line of a framebuffer.

14. The system of claim 13, wherein the memory contains further instructions which, when executed by the processing circuitry configure the system to:
determine an amount of data to read from a second line of a texture based on the modification;
configure a programmable cache line to read at least the determined amount of data from a unique address of the second line; and
store at least a portion of the determined amount of data in the first line of the framebuffer after the amount of data read from the first line of the texture.

15. The system of claim 13, wherein the memory contains further instructions which, when executed by the processing circuitry configure the system to:
configure the programmable cache line to read a predetermined amount of data by writing a predetermined value to an indicator bit, wherein the predetermined value corresponds to at least the predetermined amount of data.

16. The system of claim 15, wherein the memory contains further instructions which, when executed by the processing circuitry configure the system to:
configure the programmable cache line to read a determined second amount of data by writing a second predetermined value to the indicator bit, which is different from the predetermined value.

17. The system of claim 15, wherein the memory contains further instructions which, when executed by the processing circuitry configure the system to:
configure the programmable cache line to read the predetermined amount of data from a memory address of the texture memory.

18. The system of claim 17, wherein the memory contains further instructions which, when executed by the processing circuitry configure the system to:
write a predetermined value corresponding to the memory address to a second indicator bit, wherein the second indicator bit indicates an address from an address space of the texture memory.

19. The system of claim 13, wherein the memory contains further instructions which, when executed by the processing circuitry configure the system to:
determine an amount of data to read from a first line of a second texture map which is equal to the determined amount of data to read from the first line of the texture map, wherein the second texture map is a bitmap representing a channel of the texture map.

20. The system of claim 13, wherein the programmable cache is configured to read any one of a predetermined amount of data.

21. The system of claim 13, wherein the modification is any one of: a rotation, a stretch, a contraction, a reflection, a scaling, and a combination thereof.

22. The system of claim 13, wherein the amount of data is a discrete amount of bits.

23. The system of claim 13, wherein the memory contains further instructions which, when executed by the processing circuitry configure the system to:
read data from the framebuffer; and
configure a display to display an image based on the data read from the framebuffer.

* * * * *